UNITED STATES PATENT OFFICE.

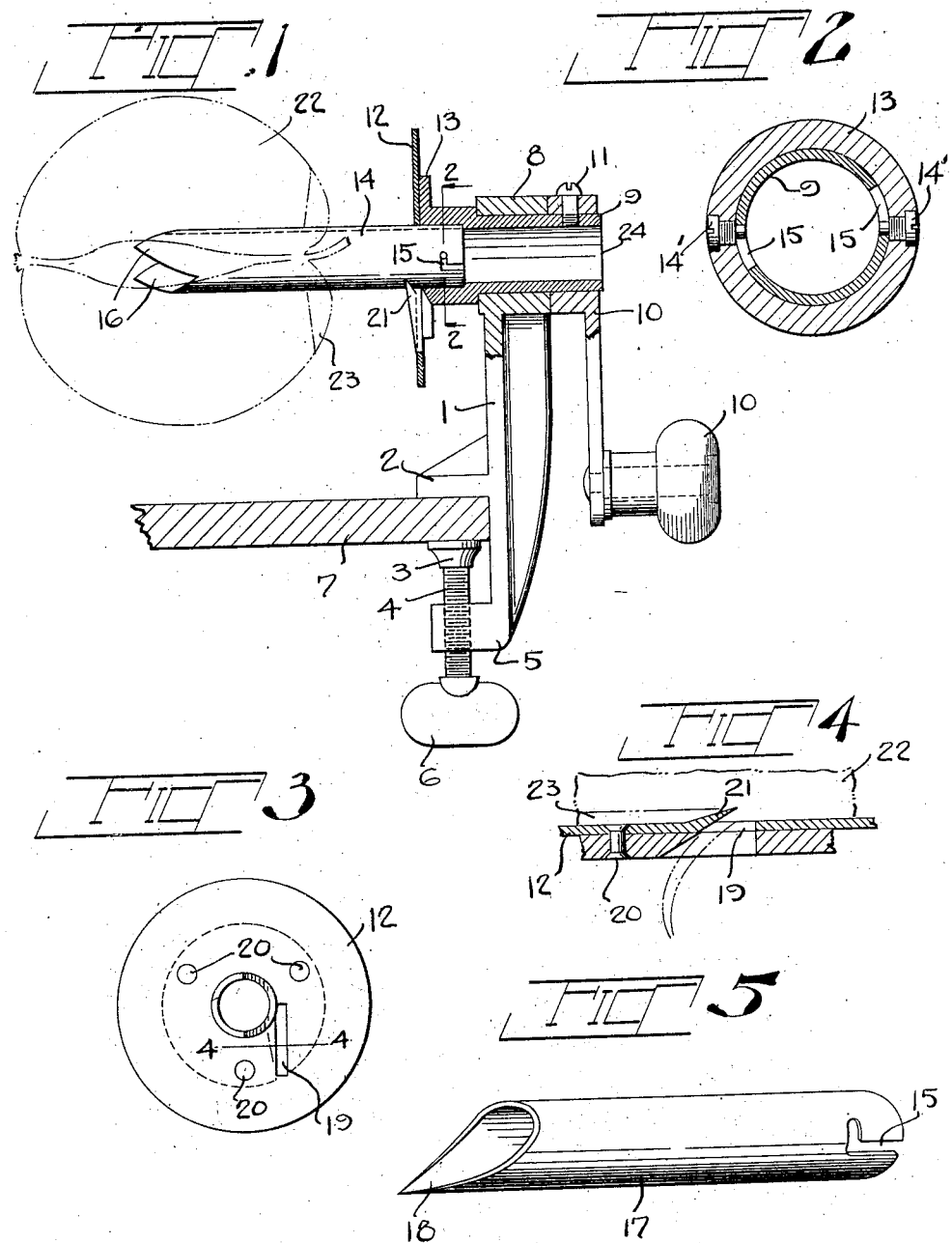

MICHELE G. DE SIMONE, OF STATEN ISLAND, NEW YORK, ASSIGNOR TO VICTOR LAMBERT, OF BROOKLYN, NEW YORK.

CORING-MACHINE.

1,382,632.  Specification of Letters Patent.  Patented June 28, 1921.

Application filed March 12, 1920. Serial No. 365,161.

*To all whom it may concern:*

Be it known that I, MICHELE G. DE SIMONE, a citizen of the United States, residing at Staten Island, county of Richmond, State of New York, have invented certain new and useful Improvements in Coring-Machines, of which the following is a specification.

This invention relates to coring machines. More particularly, the invention relates to a machine for coring and paring apples, pears and other fruits, vegetables and the like, comprising severing and paring means and common means for rotating the same.

In the more preferred forms of the invention, the severing means is rotatably mounted in a suitable supporting bearing, such severing means being hollow, a hollow shaft for such severing means and serving to discharge the cored portion, a handle for rotating the severing means and the paring means. Preferably, the core is provided with a stop plate and the paring means is mounted on such stop plate. The coring member is preferably disconnectibly secured to its shaft, to permit replacement of the coring member or substitution of other desired form of coring member.

Further features and objects of the invention will be more fully understood from the following description and the accompanying drawings, in which—

Figure 1 is a side elevation, partly in vertical sectional elevational view of one form of coring machine;

Fig. 2 is a section on line 2—2 of Fig. 1;

Fig. 3 is a detail side view of the combined stop plate and paring means;

Fig. 4 is a sectional view on line 4—4 of Fig. 3 on an enlarged scale; and

Fig. 5 is a side elevation of a modified form of coring element.

Referring to Figs. 1 to 4, inclusive, the coring device comprises the bracket 1 provided with the upper fixed clamping member 2, and lower adjustable clamping member 3, shown as a lug movably mounted on the free end of the screw 4 in threaded relation with the fixed lug 5 of the bracket 1, such screw 4 being provided with the manipulating winged head 6 whereby the bracket 1 may be clamped to the edge of a table 7, or equivalent.

At the upper portion of the bracket 1 is provided the bearing 8 through which projects the hollow shaft 9, at the outer end of which is removably secured the operating handle 10, as by means of the set screw 11. On the inner end of the hollow shaft 9 is fixed the stop plate 12, as by the rivets 20 passing through the stop plate 12 and the circular flange 13 of the hollow shaft 9.

The coring member 14 is preferably removably secured to its shaft 9, as by providing the oppositely disposed set nuts 14', 14', tapped through the hollow shaft 9 and coacting with the bayonet grooves 15, 15, respectively.

The particular coring member shown in Fig. 1 comprises the oppositely disposed severing jaws 16, having suitably sharpened lateral cutting edges, as will be understood.

In Fig. 5 I have shown another form of coring member 17 having a single cutting edge 18, the opposite edges of which are similarly sharpened for severing the portion of the article to be cored.

The paring means in the specific embodiment shown in the drawings is directly combined with the stop plate 12, as indicated in Figs. 3 and 4, as by slotting the plate 12 at 19 and upturning the portion 21 of the plate 12 and sharpening the same to form a paring cutter.

In Fig. 1, I have indicated at 22 an apple which has been partially cored by the coring member 14 and upon further manual pressure on the apple while rotating the handle 10, the apple will be brought against the stop plate 12, during which latter stage the paring cutter 21, upon continued rotation of the shaft 9, pares the portion of the peeling, indicated at 23, in Fig. 1. In Fig. 4, I have shown a portion of the apple 22 in its finally cored and pared position, the pared portion of the apple 22 being indicated at 23.

The cored portion of the apple progresses through the interior of the coring member 14, and thence through the interior 24 of the hollow shaft 9. Upon withdrawing the cored apple from the coring machine, the machine is now ready for coring a second apple, the coring and paring operation being the same as hereinabove described, the cored portion of such second apple operating to progress the cored portion of the first apple fully through the interior 24 of the hollow shaft 9. The operation is similarly repeated for succeeding apples. The paring severed by the paring cutter 21 falls exteriorly of the machine to the table 7, or into any suitable receptacle as may be provided.

It will be further apparent that the various parts of my coring machine may be readily disassembled and scoured to thoroughly cleanse the same.

Whereas I have described my invention by reference to specific forms thereof, it will be understood that many changes and modifications may be made without departing from the spirit of the invention, as defined by the appended claims.

I claim.

1. A coring machine comprising a hollow shaft, means for supporting said shaft, a hollow coring member, means for removably securing said hollow coring member to said hollow shaft, the interior of said hollow coring member communicating with the interior of said hollow shaft for the discharge of the core therethrough, a stop plate carried by said hollow shaft and paring means secured to said stop plate.

2. A coring machine comprising a hollow shaft, means for supporting said shaft, a hollow coring member, means for removably securing said hollow coring member to said hollow shaft, the interior of said hollow coring member communicating with the interior of said hollow shaft for the discharge of the core therethrough, a stop plate carried by said hollow shaft, said stop plate being provided with a paring opening for the discharge of the paring and paring means secured to said stop plate adjacent said paring discharge opening.

3. A coring machine comprising a bracket, adjustable means for securing said bracket, a hollow shaft mounted in said bracket, a handle for said hollow shaft, a stop plate mounted on said shaft, a hollow coring member, means for removably securing said hollow coring member to said hollow shaft, the interior of said hollow coring member communicating with the interior of said hollow shaft, and a paring cutter secured to said stop plate.

In testimony whereof I have signed this specification this 5th day of March 1920.

MICHELE G. DE SIMONE.